US012617459B2

(12) United States Patent
Tsukuda

(10) Patent No.: US 12,617,459 B2
(45) Date of Patent: May 5, 2026

(54) VEHICLE CONTROL DEVICE

(71) Applicant: Hino Motors, Ltd., Tokyo (JP)

(72) Inventor: Shunsuke Tsukuda, Hino (JP)

(73) Assignee: Hino Motors, Ltd., Tokyo (JP)

( * ) Notice: Subject to any disclaimer, the term of this patent is extended or adjusted under 35 U.S.C. 154(b) by 86 days.

(21) Appl. No.: 18/840,171

(22) PCT Filed: Feb. 14, 2023

(86) PCT No.: PCT/JP2023/005040
§ 371 (c)(1),
(2) Date: Aug. 21, 2024

(87) PCT Pub. No.: WO2023/162786
PCT Pub. Date: Aug. 31, 2023

(65) Prior Publication Data
US 2025/0187658 A1 Jun. 12, 2025

(30) Foreign Application Priority Data

Feb. 24, 2022 (JP) ................................ 2022-026503

(51) Int. Cl.
*B62D 13/00* (2006.01)
*B62D 6/00* (2006.01)
(52) U.S. Cl.
CPC .............. *B62D 6/008* (2013.01); *B62D 6/005* (2013.01)
(58) Field of Classification Search
CPC ......... B62D 6/008; B62D 13/00; B62D 6/005
See application file for complete search history.

(56) References Cited

U.S. PATENT DOCUMENTS 12,024,246 B2 * 7/2024 Mizoguchi ............. B62D 6/003
2014/0303849 A1 * 10/2014 Hafner ................... H04N 7/183
701/1

(Continued)

FOREIGN PATENT DOCUMENTS

JP 2017-135917 A 8/2017
JP 2018-122731 A 8/2018

(Continued)

OTHER PUBLICATIONS

International Search Report issued May 9, 2023 in PCT No. JP2023/005040, 2 pages.

(Continued)

*Primary Examiner* — Long T Tran
(74) *Attorney, Agent, or Firm* — Oblon, McClelland, Maier & Neustadt, L.L.P.

(57) ABSTRACT

A vehicle control device according to an embodiment includes a lateral position acquisition unit configured to acquire a lateral position of the vehicle, a feedforward control unit configured to determine a feedforward steering angle corresponding to the target yaw rate, a feedback control unit configured to determine a feedback steering angle, a steering angle determination unit configured to determine a steering angle of the vehicle, a wobble determination unit configured to detect a wobble of the vehicle based on a temporal change in the lateral position of the vehicle, and a correction unit configured to correct the feedback steering angle so that a variation amount with respect to an average value of the feedback steering angle in a most recent certain period becomes small when the wobble of the vehicle is detected by the wobble determination unit.

5 Claims, 5 Drawing Sheets

(56)    References Cited

U.S. PATENT DOCUMENTS

| | | | |
|---|---|---|---|
| 2016/0031482 A1* | 2/2016 | Lavoie | B60W 30/18036 |
| | | | 701/41 |
| 2016/0101811 A1* | 4/2016 | Kyrtsos | B62D 15/0285 |
| | | | 701/25 |
| 2018/0086341 A1* | 3/2018 | Taniguchi | B62D 6/008 |
| 2018/0267708 A1 | 9/2018 | Harada | |
| 2021/0039632 A1* | 2/2021 | Kim | B60D 1/30 |
| 2021/0339588 A1* | 11/2021 | Takahama | G06V 20/56 |
| 2022/0242481 A1* | 8/2022 | Mizoguchi | B62D 6/003 |
| 2023/0286492 A1* | 9/2023 | Frankovics | B60W 10/18 |
| 2024/0010036 A1* | 1/2024 | Dhaens | B60G 17/0195 |

FOREIGN PATENT DOCUMENTS

| | | | |
|---|---|---|---|
| JP | 2018-144691 A | 9/2018 | |
| JP | 2019-156066 A | 9/2019 | |
| JP | 2020-40524 A | 3/2020 | |

OTHER PUBLICATIONS

International Preliminary Report on Patentability and Written Opinion issued Sep. 6, 2024 in PCT No. JP2023/005040, (submitting English Translation only), 5 pages.

* cited by examiner

VEHICLE CONTROL DEVICE

TECHNICAL FIELD

The present disclosure relates to a vehicle control device that controls a steering angle of a vehicle.

BACKGROUND ART

A vehicle control device that controls a steering angle of a vehicle is known. For example, Patent Literature 1 below describes a travel control device that is mounted on a vehicle towing a trailer and calculates a target steering angle for traveling following a target route. When detecting the roll vibration of the trailer, the travel control device calculates a corrected steering angle for reducing the roll vibration, performs steering correction in accordance with the cycle and phase of the roll vibration of the trailer with the target steering angle as a base point by the calculated corrected steering angle, and reduces the roll vibration of the trailer.

CITATION LIST

Patent Literature

Patent Literature 1: Japanese Unexamined Patent Publication No. 2019-156066

SUMMARY OF INVENTION

Technical Problem

The device described in Patent Literature 1 calculates a target steering angle by adding a steering angle calculated from a curvature of a target route by feedforward control and a steering angle calculated from a lateral position deviation and a yaw angle deviation with respect to the target route by feedback control. In such feedback control, the feedback amount of the steering angle greatly varies depending on the characteristics of the vehicle, and the vehicle may wobble. In particular, since a coupling vehicle towing a trailer has a complicated behavior as compared with an uncoupled vehicle such as a truck, a feedback amount of a steering angle becomes excessive in general feedback control, and wobble easily occurs.

Therefore, an object of the present disclosure is to provide a vehicle control device capable of suppressing the wobble of the vehicle.

Solution to Problem

According to an embodiment, a vehicle control device mounted on a vehicle with a yaw rate sensor to measure a yaw rate and a steering angle sensor to measure a steering angle, and configured to control the steering angle of the vehicle so that the yaw rate of the vehicle becomes a target yaw rate is provided. The vehicle control device includes a lateral position acquisition unit configured to acquire a lateral position of the vehicle, a feedforward control unit configured to determine a feedforward steering angle corresponding to the target yaw rate, a feedback control unit configured to determine a feedback steering angle based on a yaw rate of the vehicle measured by the yaw rate sensor and a steering angle of the vehicle measured by the steering angle sensor, a target steering angle determination unit configured to determine a target steering angle of the vehicle based on the feedforward steering angle and the feedback steering angle, a wobble determination unit configured to detect a wobble of the vehicle based on a temporal change in the lateral position of the vehicle, and a correction unit configured to correct the feedback steering angle so that a variation amount with respect to an average value of the feedback steering angle in a most recent certain period is reduced when the wobble of the vehicle is detected.

In the present aspect, the feedback steering angle is corrected so that the variation amount with respect to the average value of the feedback steering angle in the most recent certain period is reduced when the wobble of the vehicle is detected. As described above, by reducing the variation amount of the feedback steering angle, the variation of the target steering angle is also reduced, so that the wobble of the vehicle can be suppressed.

In an embodiment, the wobble determination unit may determine that the vehicle wobbles when the number of times a variation amount of the lateral position exceeds the first threshold value within the predetermined period is the second threshold value or more. In this manner, by determining the wobble of the vehicle using the variation amount of the lateral position of the vehicle, the wobble of the vehicle can be appropriately detected.

In an embodiment, the correction unit may stop correction of the feedback steering angle when an amount of change in curvature of a travel lane of the vehicle becomes a third threshold value or more. When the curvature of the travel lane changes, the average value of the feedback steering angles changes, so that it becomes difficult to appropriately correct the feedback steering angle. In this embodiment, since the correction of the feedback steering angle is stopped when the amount of change in curvature of the traveling lane increases, it is possible to perform appropriate steering angle control according to the travel environment.

In an embodiment, the correction unit may stop the correction of the feedback steering angle when an amount of change in the inclination angle in a width direction of a travel lane of the vehicle becomes a fourth threshold value or more. When the inclination angle in the width direction of the travel lane changes, the average value of the feedback steering angles changes, so that it becomes difficult to appropriately correct the feedback steering angle. In this embodiment, since the correction of the feedback steering angle is stopped when the amount of change in inclination angle in the width direction of the travel lane increases, it is possible to perform appropriate steering angle control according to the travel environment.

In an embodiment, the correction unit may stop correction of the feedback steering angle when an amount of change of the lateral position of the vehicle becomes a fifth threshold value or more. When the amount of change of the lateral position of the vehicle is large, there is a possibility that the steering angle control is not appropriately performed. In this embodiment, since the correction of the feedback steering angle is stopped when the amount of change of the lateral position of the vehicle increases, it is possible to perform appropriate steering angle control.

Advantageous Effects of Invention

According to one aspect and various embodiments of the present invention, the wobble of the vehicle can be suppressed.

DESCRIPTION OF EMBODIMENTS

Figure 1:
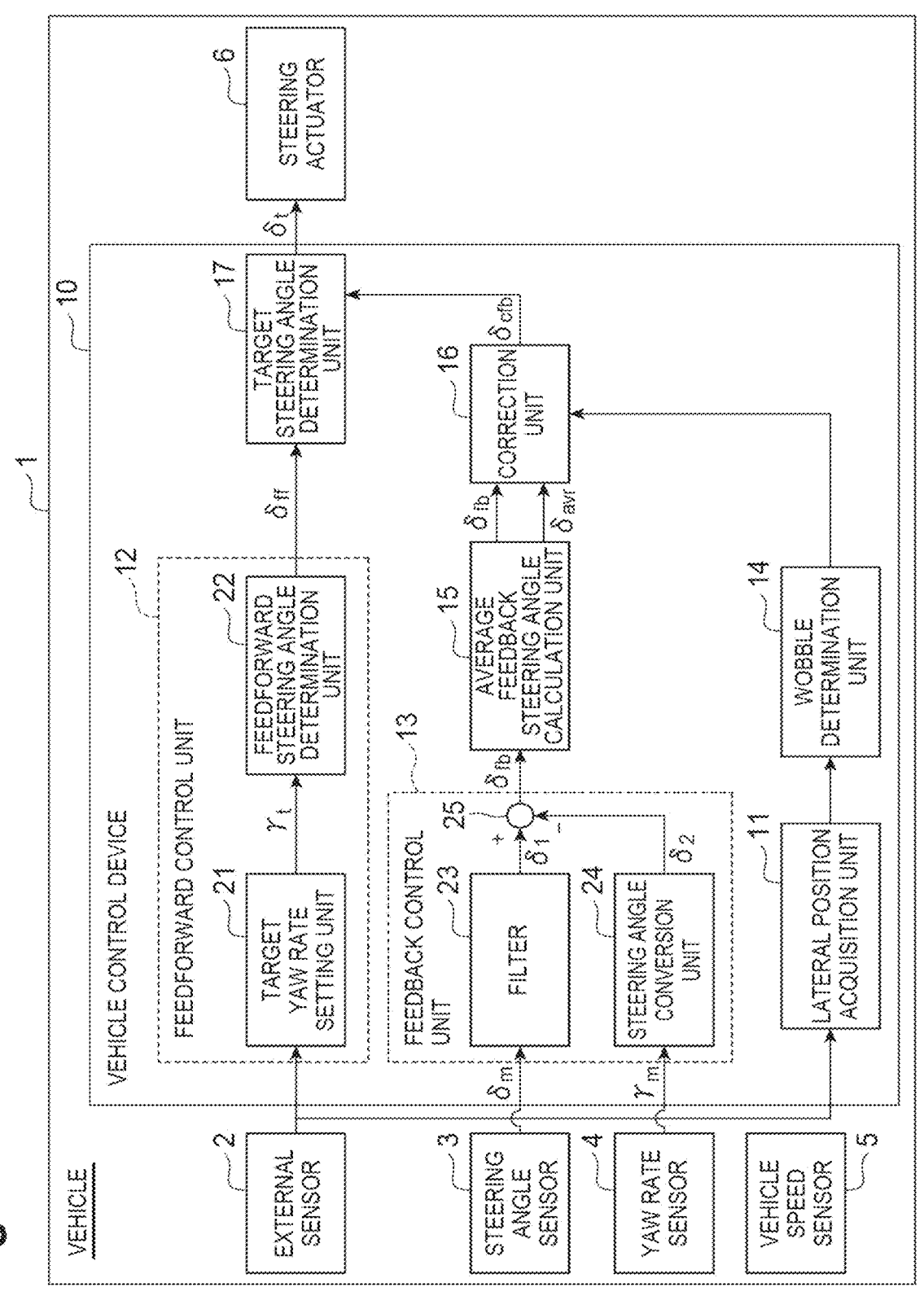
FIG. 1 is a block diagram illustrating a functional configuration of a vehicle on which a vehicle control device according to an embodiment is mounted.

Hereinafter, a vehicle control device according to various embodiments will be described in detail with reference to the drawings. In the drawings, the same or corresponding portions are denoted by the same reference numerals, and redundant description of the same or corresponding portions is omitted.

FIG. 1 is a block diagram illustrating a functional configuration of a vehicle on which a vehicle control device according to an embodiment is mounted. A vehicle control device 10 illustrated in FIG. 1 is mounted on a vehicle 1, and controls a steering angle of the vehicle 1 so that the vehicle 1 travels along a travel lane.

The vehicle 1 on which the vehicle control device 10 is mounted is, for example, a cargo vehicle on which cargo is loaded. In one embodiment, the vehicle 1 may be a coupling vehicle including a tractor and a trailer coupled to the tractor at a coupling point. The coupling point includes, for example, a coupler provided on the tractor side and a pin provided on the trailer side. The trailer of the vehicle 1 turns about the coupling point as the yaw angle of the tractor changes.

As illustrated in FIG. 1, the vehicle 1 includes an external sensor 2, a steering angle sensor 3, a yaw rate sensor 4, a vehicle speed sensor 5, a steering actuator 6, and a vehicle control device 10. The external sensor 2 detects information on the external environment of the vehicle 1. As the external sensor 2, for example, a camera is used. The camera captures an image in front of the vehicle 1. The camera may be a monocular camera or a stereo camera. The stereo camera has two imaging units arranged to reproduce binocular parallax. The imaging information of the stereo camera also includes information in the depth direction.

The steering angle sensor 3 measures a steering angle (a rotation amount of a steering shaft) of the vehicle 1. The yaw rate sensor 4 measures a yaw rate of the vehicle 1. The yaw rate is a rotational angular velocity around the vertical axis of the vehicle 1. For example, a gyro sensor is used as the yaw rate sensor 4. The vehicle speed sensor 5 detects the speed of the vehicle 1. As the vehicle speed sensor 5, for example, a wheel speed sensor that is provided on a drive shaft of the vehicle 1 and detects a rotation speed of a wheel is used. The steering angle sensor 3, the yaw rate sensor 4, and the vehicle speed sensor 5 output information indicating the measured steering angle, yaw rate, and speed of the vehicle 1 to the vehicle control device 10.

The steering actuator 6 controls driving of an electric power steering system in accordance with a control signal from the vehicle control device 10. The steering angle of the vehicle 1 is controlled by controlling the driving of the electric power steering system.

The vehicle control device 10 is an electronic control unit including a central processing unit (CPU), a read only memory (ROM), a random access memory (RAM), a controller area network (CAN) communication circuit, and the like. The vehicle control device 10 is connected to a network that communicates using, for example, the CAN communication circuit, and is communicably connected to each component of the vehicle 1. For example, based on a signal output from the CPU, the vehicle control device 10 operates the CAN communication circuit to input and output data, stores the data in the RAM, loads a program stored in the ROM into the RAM, and executes the program loaded in the RAM, thereby implementing various functions described later. The vehicle control device 10 may include a plurality of electronic control units.

The vehicle control device 10 controls the steering angle of the vehicle 1 so that the yaw rate of the vehicle 1 becomes the target yaw rate. As illustrated in FIG. 1, the vehicle control device 10 includes, as a functional configuration, a lateral position acquisition unit 11, a feedforward control unit 12, a feedback control unit 13, a wobble determination unit 14, an average feedback steering angle calculation unit 15, a correction unit 16, and a target steering angle determination unit 17.

The lateral position acquisition unit 11 acquires the lateral position of the vehicle 1 (the position in the width direction of the vehicle 1 in the travel lane) based on the information output from the external sensor 2. For example, the lateral position acquisition unit 11 extracts a lane division line (white line) of the travel lane from the image captured by the camera, and detects the lateral position of the vehicle 1 based on the positional relationship between the vehicle and the lane division line.

The feedforward control unit 12 performs feedforward control to determine a feedforward steering angle $\delta_{ff}$ corresponding to the target yaw rate $\gamma_t$. As illustrated in FIG. 1, the feedforward control unit 12 includes a target yaw rate setting unit 21 and a feedforward steering angle determination unit 22. The target yaw rate setting unit 21 detects the curvature of the travel lane in front of the vehicle 1 from the image captured by the external sensor 2, for example, and determines the target yaw rate $\gamma_t$ according to the curvature. The target yaw rate $\gamma_t$ is a yaw rate at which the vehicle 1 travels along the travel lane having the detected curvature.

The feedforward steering angle determination unit 22 determines a feedforward steering angle $\delta_{ff}$ corresponding to the target yaw rate $\gamma_t$. The feedforward steering angle $\delta_{ff}$ is a steering angle for setting the yaw rate of the vehicle 1 to the target yaw rate $\gamma_t$. For example, the feedforward steering angle determination unit 22 calculates the feedforward steering angle $\delta_{ff}$ by solving the following Equation (1).

[Equation 1]

$$\gamma_t = P\delta_{ff} \tag{1}$$

In Equation (1), P is a conversion formula for converting a yaw rate into a steering angle. The conversion formula P is expressed as, for example, the following Equation (2).

[Equation 2]

$$P = \frac{V}{l \cdot (1 + Ks \cdot V^2)} \tag{2}$$

In Equation (2), l represents a wheelbase, Ks represents a stability factor, and V represents the speed of the vehicle 1. The wheelbase l and the stability factor Ks are predetermined setting values.

The feedback control unit 13 determines the feedback steering angle $\delta_{fb}$ based on the yaw rate $\gamma_m$ of the vehicle 1 measured by the yaw rate sensor 4 and the steering angle $\delta_m$ of the vehicle 1 measured by the steering angle sensor 3. As illustrated in FIG. 1, the feedback control unit 13 includes a filter 23, a steering angle conversion unit 24, and a differentiator 25. The filter 23 executes filter processing on the steering angle $\delta_m$ of the vehicle 1 measured by the steering angle sensor 3 according to the following Equation (3) to calculate the steering angle $\delta_1$. In Equation (3), a represents a cutoff frequency, and s represents a Laplace operator.

[Equation 3]

$$\delta_1 = \frac{1}{1 + as} \cdot \delta_m \tag{3}$$

The steering angle conversion unit 24 calculates a steering angle $\delta_2$ corresponding to the yaw rate $\gamma_m$ of the vehicle 1 measured by the yaw rate sensor 4. For example, the steering angle conversion unit 24 converts the yaw rate $\gamma_m$ into the steering angle $\delta_2$ according to the following Equation (4).

[Equation 4]

$$\delta_2 = \frac{1 + \tau s}{P(1 + as)} \cdot \gamma_m \tag{4}$$

In Equation (4), t represents a response delay of the vehicle. The term of $(1+\tau s)/P$ in Equation (4) corresponds to the reciprocal of the plant model of the first-order lag system. That is, the feedback control unit 13 converts the yaw rate $\gamma_m$ into the steering angle 82 assuming that the plant model of the vehicle 1 is a first-order lag system.

The differentiator 25 outputs a difference between the steering angle $\delta_1$ output from the filter 23 and the steering angle $\delta_2$ output from the steering angle conversion unit 24 as a feedback steering angle $\delta_{fb}$. As described above, the feedforward steering angle $\delta_{ff}$ determined by the feedforward control unit 12 is a steering angle corresponding to the target yaw rate $\gamma_t$. However, since disturbance such as cant (gradient in the width direction) and crosswind acts on the vehicle 1 in reality, if the steering angle of the vehicle 1 is set to the feedforward steering angle off, a deviation occurs between the yaw rate of the vehicle 1 and the target yaw rate. The feedback steering angle $\delta_{fb}$ is a steering angle for suppressing disturbance acting on the vehicle 1.

Here, since the tractor and the trailer affect each other, the coupling vehicle makes a complicated movement. For this reason, when the feedback steering angle $\delta_{fb}$ according to a plant model of a general first-order lag system is fed back, the steering angle of the vehicle 1 may be excessively larger than the steering angle to be given to cancel the disturbance. When the feedback process is performed using the excessive feedback steering angle $\delta_{fb}$, the vehicle 1 wobbles, and the behavior of the vehicle 1 may become unstable.

Figure 2:
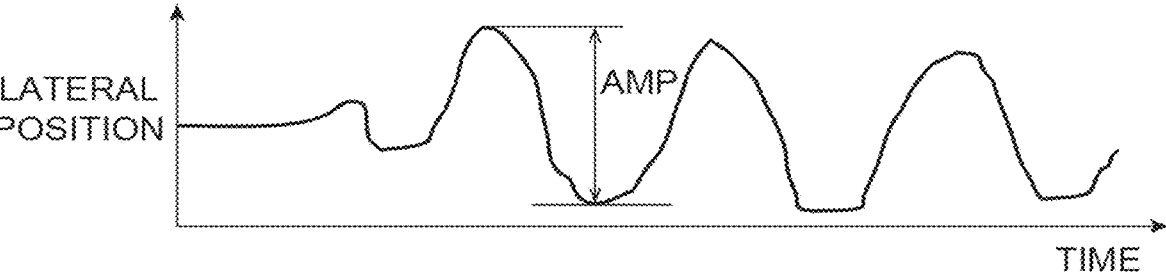
FIG. 2 is a diagram illustrating an example of time-series data indicating a temporal change in a lateral position of the vehicle.

The wobble determination unit 14 detects the wobble of the vehicle based on a temporal change in the lateral position of the vehicle 1. For example, the wobble determination unit 14 generates time series data indicating the temporal change in the lateral position of the vehicle 1 acquired by the lateral position acquisition unit 11. FIG. 2 illustrates an example of time-series data indicating the temporal change in a lateral position of the vehicle 1. The wobble determination unit 14 measures the number of times the amplitude (variation value between adjacent peaks) AMP of the time series data at the lateral position has exceeded the first threshold value, and determines that the vehicle 1 has wobbled when the number of times the amplitude AMP has exceeded the first threshold value within a predetermined period is equal to or greater than the second threshold value.

That is, the wobble determination unit 14 determines that the vehicle wobbles when the number of times the variation amount of the lateral position of the vehicle 1 exceeds the first threshold value within the predetermined period is the second threshold value or more. On the other hand, the wobble determination unit 14 determines that no wobble occurs in the vehicle 1 when the number of times the variation amount of the lateral position of the vehicle 1 exceeds the first threshold value within the predetermined period is smaller than the second threshold value. The wobble determination unit 14 outputs information indicating the presence or absence of the wobble to the correction unit 16.

The average feedback steering angle calculation unit 15 calculates an average value of the feedback steering angle $\delta_{fb}$ output from the feedback control unit 13. For example, the average feedback steering angle calculation unit 15 generates time-series data of the feedback steering angle $\delta_{fb}$ and calculates an average value of the feedback steering angle $\delta_{fb}$ in the most recent certain period. Then, the calculated average value of the feedback steering angle $\delta_{fb}$ is output to the correction unit 16 as an average feedback steering angle $\delta_{avr}$.

Figure 3:
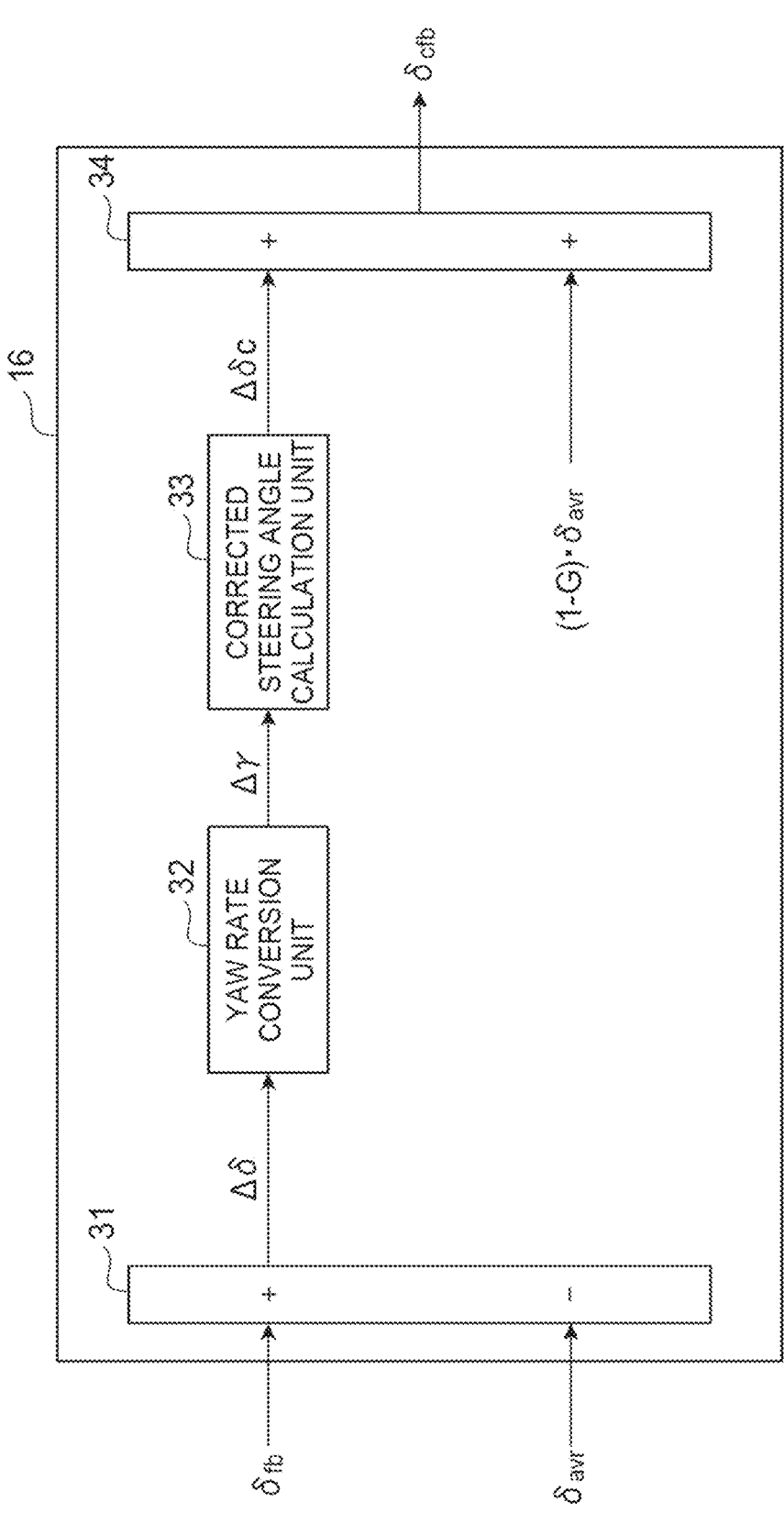
FIG. 3 is a block diagram illustrating a functional configuration of a correction unit.

The correction unit 16 corrects the feedback steering angle $\delta_{fb}$ so that the variation amount with respect to the average feedback steering angle $\delta_{avr}$ is reduced when the wobble determination unit 14 detects the wobble of the vehicle 1. FIG. 3 is a block diagram illustrating a functional configuration of the correction unit 16. As illustrated in FIG. 3, the correction unit 16 includes a differentiator 31, a yaw rate conversion unit 32, a corrected steering angle calculation unit 33, and an adder 34.

The differentiator 31 outputs a difference between the feedback steering angle $\delta_{ff}$ determined by the feedback control unit 13 and the average feedback steering angle $\delta_{avr}$ output from the average feedback steering angle calculation unit 15 as a steering angle $\Delta\delta$. The steering angle $\Delta\delta$ is a variation amount of the feedback steering angle $\delta_{fb}$ with respect to the average feedback steering angle $\delta_{avr}$.

The yaw rate conversion unit 32 converts the steering angle $\Delta\delta$ into the yaw rate $\Delta\gamma$ using the conversion formula P. For example, the yaw rate conversion unit 32 calculates the yaw rate $\Delta\gamma$ by the following Equation (5).

[Equation 5]

$$\Delta\gamma = P \cdot \Delta\delta \tag{5}$$

The corrected steering angle calculation unit 33 calculates a corrected steering angle $\Delta\delta_c$ by multiplying the yaw rate $\Delta\gamma$ by the gain and then converting the yaw rate into the steering angle again using the conversion formula P. For example, the corrected steering angle calculation unit 33 calculates the corrected steering angle $\Delta\delta_c$ by the following Equation (6).

[Equation 6]

$$\Delta\delta_c = \frac{G}{P} \cdot \Delta\gamma \tag{6}$$

Here, in Equation (6), G represents a gain. The corrected steering angle calculation unit 33 sets the gain G to a value smaller than 1 when correcting the feedback steering angle $\delta_{fb}$. For example, the gain G is set to 0.3 or more and 0.7 or less. The gain G may be set to 0.5. By setting the gain G to a value smaller than 1, the corrected steering angle $\Delta\delta_c$ becomes smaller than the steering angle $\Delta\delta$. As described later, since the corrected steering angle $\Delta\delta_c$ is a variation amount of the steering angle with respect to the average feedback steering angle $\delta_{avr}$, the variation amount of the target steering angle $\delta_t$ is reduced by setting the gain G to be smaller than 1. The corrected steering angle calculation unit 33 outputs the calculated corrected steering angle $\Delta\delta_c$ to the adder 34.

Figure 4:
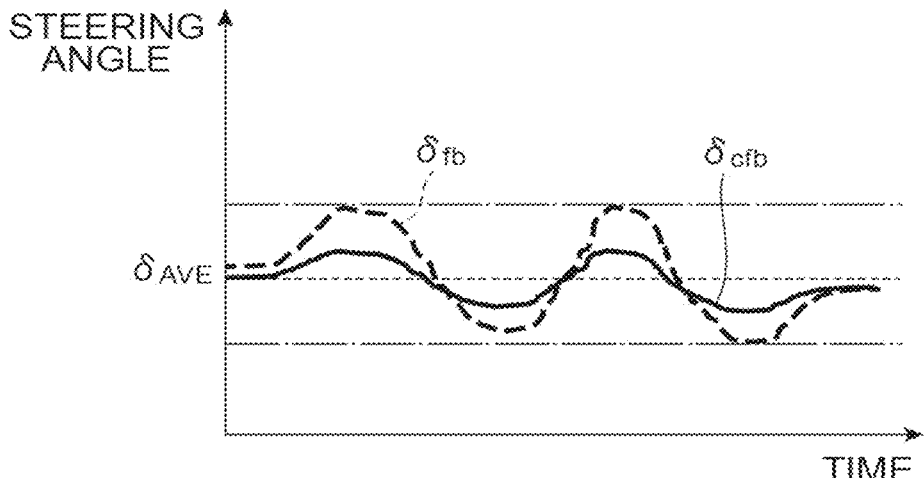
FIG. 4 is a diagram illustrating an example of a feedback steering angle before correction and a feedback steering angle after correction.

The adder 34 adds $(1-G)\cdot\delta_{avr}$ to the corrected steering angle $\Delta\delta_c$ output from the corrected steering angle calculation unit 33, and outputs the result as a corrected feedback steering angle $\delta_{cfb}$. The corrected feedback steering angle $\delta_{cfb}$ is the feedback steering angle corrected by the correction unit 16. FIG. 4 is a diagram illustrating the feedback steering angle $\delta_{fb}$ before correction and the corrected feedback steering angle $\delta_{cfb}$ arranged on the same time axis. As illustrated in FIG. 4, by adding $(1-G)\cdot\delta_{avr}$ to the corrected steering angle $\Delta\delta_c$, the average value of the corrected feedback steering angle $\delta_{cfb}$ becomes equal to the average feedback steering angle $\delta_{avr}$. Since the average value of the corrected feedback steering angle $\delta_{cfb}$ matches the average value of the feedback steering angle $\delta_{fb}$ before correction, the steering angle that cancels the disturbance can be fed back even when the disturbance such as cant acts on the vehicle 1.

As described above, the corrected feedback steering angle $\delta_{cfb}$ is obtained by adding the corrected steering angle $\Delta\delta_c$, which is the variation amount of the steering angle, to the average feedback steering angle $\delta_{avr}$. Since the corrected steering angle $\Delta\delta_c$ is smaller than the steering angle $\Delta\delta$ before correction, it can be said that the corrected feedback steering angle $\delta_{cfb}$ is a steering angle having a smaller variation amount with respect to the average feedback steering angle $\delta_{avr}$ than the feedback steering angle $\delta_{fb}$.

As illustrated in FIG. 1, the corrected feedback steering angle $\delta_{cfb}$ calculated by the correction unit 16 is output to the target steering angle determination unit 17. Note that the corrected feedback steering angle $\delta_{cfb}$ may be output to the target steering angle determination unit 17 after performing saturation control so as not to cause a sudden change in the steering angle.

On the other hand, when the wobble determination unit 14 determines that the vehicle 1 is not wobbled, the correction unit 16 outputs the feedback steering angle $\delta_{fb}$ to the target steering angle determination unit 17 without correcting the feedback steering angle $\delta_{fb}$. For example, the correction unit 16 outputs the uncorrected feedback steering angle $\delta_{fb}$ to the target steering angle determination unit 17 by setting the gain G to 1.

When the travel environment of the vehicle 1 changes, the correction unit 16 may stop the correction of the feedback steering angle $\delta_{fb}$ because the feedback steering angle of is likely to greatly vary from the average feedback steering angle $\delta_{avr}$. For example, the correction unit 16 may stop the correction of the feedback steering angle $\delta_{fb}$ and output the feedback steering angle $\delta_{fb}$ to the target steering angle determination unit 17 when the amount of change in curvature of the travel lane, the change amount of the cant angle of the travel lane (the inclination angle in the width direction of the travel lane), or the change amount of the lateral position of the vehicle becomes equal to or larger than a threshold value. Note that the amount of change in curvature refers to, for example, a difference between the curvature of the travel lane at the time when the correction of the feedback steering angle $\delta_{fb}$ is started by the correction unit 16 and the curvature of the latest travel lane. The change amount of the cant angle refers to, for example, a difference between the cant angle of the travel lane at the time when the correction of the feedback steering angle $\delta_{fb}$ is started by the correction unit 16 and the latest cant angle of the travel lane. The change amount of the lateral position refers to, for example, a difference between the lateral position of the vehicle at the time when the correction of the feedback steering angle $\delta_{fb}$ is started by the correction unit 16 and the latest lateral position of the vehicle.

The target steering angle determination unit 17 determines the target steering angle $\delta_t$ of the vehicle based on the feedforward steering angle $\delta_{ff}$ and the corrected feedback steering angle $\delta_{cfb}$. For example, when the vehicle 1 wobbles, the target steering angle determination unit 17 outputs the sum of the feedforward steering angle $\delta_{ff}$ and the corrected feedback steering angle $\delta_{cfb}$ to the steering actuator 6 as the target steering angle $\delta_t$. The target steering angle $\delta_t$ is a steering angle for setting the yaw rate of the vehicle 1 to the target yaw rate $\gamma_t$. Note that, when the vehicle 1 does not wobble, the target steering angle determination unit 17 outputs the sum of the feedforward steering angle $\delta_{ff}$ and the feedback steering angle $\delta_{fb}$ before correction to the steering actuator 6 as the target steering angle $\delta_t$.

The steering actuator 6 controls driving of the electric power steering system such that the steering angle of the vehicle 1 becomes the target steering angle $\delta_t$. When the steering angle of the vehicle 1 is controlled to approach the target steering angle $\delta_t$, the vehicle 1 can travel along the travel lane. In addition, since the corrected feedback steering angle $\delta_{cfb}$ has a smaller variation amount with respect to the average feedback steering angle $\delta_{avr}$ than the feedback steering angle $\delta_{fb}$, the target steering angle $\delta_t$ is a steering angle having a small variation amount. By controlling the steering angle of the vehicle 1 so as to achieve such a target steering angle $\delta_t$, the wobble of the vehicle 1 can be suppressed.

Figure 5:
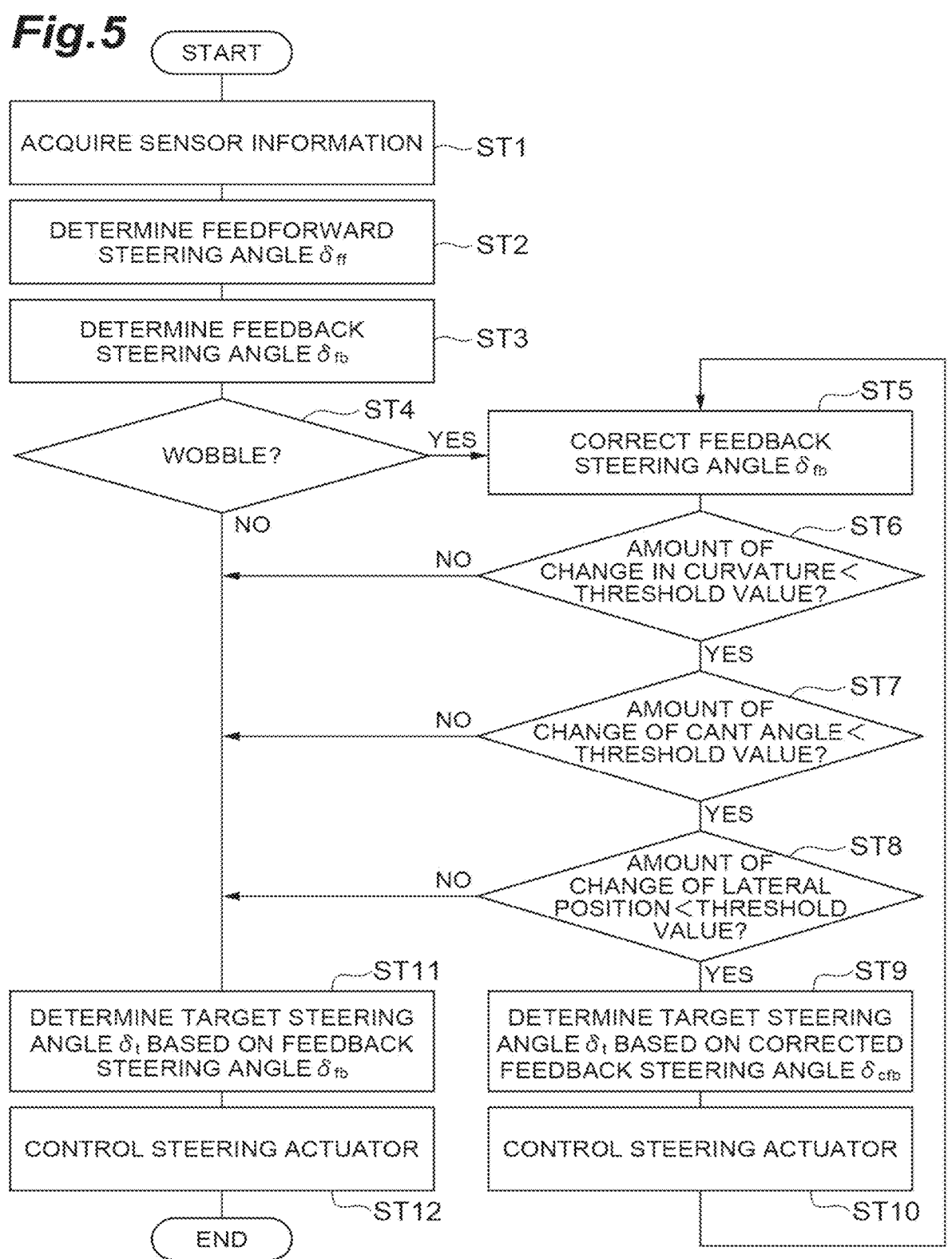
FIG. 5 is a flowchart illustrating a flow of processing of the vehicle control device.

Next, with reference to FIG. 5, the operation of the vehicle control device 10 will be described. FIG. 5 is a flowchart illustrating a flow of processing of the vehicle control device 10. As illustrated in FIG. 5, first, the vehicle control device 10 acquires various sensor information measured by the external sensor 2, the steering angle sensor 3, the yaw rate sensor 4, and the vehicle speed sensor 5 (step ST1). For example, the vehicle control device 10 acquires image information in front of the vehicle 1, a steering angle $\delta_m$, a yaw rate $\gamma_m$, and a vehicle speed.

Next, the feedforward control unit 12 of the vehicle control device 10 calculates the target yaw rate $\gamma_t$ corresponding to the curvature of the travel lane, and determines the feedforward steering angle $\delta_{ff}$ corresponding to the target yaw rate $\gamma_t$ (step ST2).

Next, the feedback control unit 13 of the vehicle control device 10 determines the feedback steering angle $\delta_{fb}$ based on the steering angle $\delta_m$ and the yaw rate $\gamma_m$ of the vehicle 1 (step ST3). The feedback steering angle of is determined, for example, based on the difference between the steering angle $\delta_1$ obtained from the steering angle $\delta_m$ of the vehicle 1 and the steering angle $\delta_2$ corresponding to the yaw rate $\gamma_m$ of the vehicle 1.

Next, the wobble determination unit 14 determines whether or not the vehicle 1 wobbles (step ST4). The wobble determination unit 14 determines, for example, that the vehicle 1 wobbles when the number of times the variation amount of the lateral position of the vehicle 1 exceeds the first threshold value within the predetermined period is the second threshold value or more.

When it is determined that the vehicle 1 wobbles, the correction unit 16 corrects the feedback steering angle $\delta_{fb}$ to the corrected feedback steering angle $\delta_{cfb}$ (step ST5). The corrected feedback steering angle $\delta_{cfb}$ is a steering angle having a smaller variation amount with respect to the average feedback steering angle $\delta_{avr}$ than the feedback steering angle $\delta_{fb}$. In addition, the average value of the corrected feedback steering angle $\delta_{cfb}$ matches an average feedback steering angle $\delta_{avr}$.

Next, the correction unit 16 determines whether or not the amount of change in curvature of the travel lane in a certain period is less than the third threshold value (step ST6). If the amount of change in curvature is less than the third threshold value, the correction unit 16 determines whether or not the change amount of the cant angle of the travel lane in a certain period is less than the fourth threshold value (step ST7). If the change amount of the cant angle is less than the fourth threshold value, the correction unit 16 determines whether or not the change amount of the lateral position of the vehicle 1 in the travel lane in a certain period is less than the fifth threshold value (step ST8).

If the change amount of the lateral position of the vehicle 1 is less than the fifth threshold value, the target steering angle determination unit 17 determines the target steering angle $\delta_t$ based on the feedforward steering angle $\delta_{ff}$ and the corrected feedback steering angle $\delta_{cfb}$ (step ST9). For example, the target steering angle $\delta_t$ is a steering angle obtained by adding the feedforward steering angle $\delta_{ff}$ and the corrected feedback steering angle $\delta_{cfb}$. Next, the steering actuator 6 controls a steering system such that the steering angle of the vehicle 1 becomes the target steering angle $\delta_t$ (step ST10). Then, the processing of steps ST5 to ST10 is repeatedly executed at a predetermined cycle until the correction of the feedback steering angle $\delta_{fb}$ is stopped.

On the other hand, if the amount of change in curvature of the travel lane is equal to or greater than the third threshold value, if the change amount of the cant angle is equal to or greater than the fourth threshold value, or if the change amount of the lateral position of the vehicle 1 is equal to or greater than the fifth threshold value, the correction unit 16 stops the correction of the feedback steering angle $\delta_{fb}$. Then, the target steering angle determination unit 17 determines the target steering angle $\delta_t$ based on the feedforward steering angle $\delta_{ff}$ and the uncorrected feedback steering angle $\delta_{fb}$ (step ST11). In this case, the target steering angle $\delta_t$ is a steering angle obtained by adding the feedforward steering angle $\delta_{ff}$ and the feedback steering angle $\delta_{fb}$. Next, the steering actuator 6 controls the steering system such that the steering angle of the vehicle 1 becomes the target steering angle $\delta_t$ (step ST12).

As described above, in the vehicle control device 10 according to an embodiment, when the wobble of the vehicle 1 is detected, the feedback steering angle $\delta_{fb}$ is corrected so as to reduce the variation amount with respect to the average feedback steering angle $\delta_{avr}$, which is the average value of the feedback steering angle of in the most recent certain period. As a result, the variation of the feedback steering angle is reduced, and accordingly, the variation of the target steering angle $\delta_t$ of the vehicle 1 also becomes small. Therefore, the wobble of the vehicle 1 can be reduced. In addition, since the average value of the corrected feedback steering angle $\delta_{cfb}$ matches the average feedback steering angle $\delta_{avr}$, the vehicle can be caused to travel along the travel lane even when disturbance such as cant acts on the vehicle 1, for example.

Although the vehicle control device 10 according to various embodiments has been described above, various modifications can be made without being limited to the above-described embodiments and without changing the gist of the invention.

REFERENCE SIGNS LIST 1 vehicle
3 steering angle sensor
4 yaw rate sensor
10 vehicle control device
11 lateral position acquisition unit
12 feedforward control unit
13 feedback control unit
14 determination unit
16 correction unit
17 target steering angle determination unit
$\gamma_t$ target yaw rate
$\delta_{fb}$ feedback steering angle
$\delta_{ff}$ feedforward steering angle
$\delta_t$ target steering angle

The invention claimed is:

1. A vehicle control device mounted on a vehicle with a yaw rate sensor to measure a yaw rate and a steering angle sensor to measure a steering angle, and configured to control the steering angle of the vehicle so that the yaw rate of the vehicle becomes a target yaw rate, the vehicle control device comprising:

a lateral position acquisition unit configured to acquire a lateral position of the vehicle;

a feedforward control unit configured to determine a feedforward steering angle corresponding to the target yaw rate;

a feedback control unit configured to determine a feedback steering angle based on a yaw rate of the vehicle measured by the yaw rate sensor and a steering angle of the vehicle measured by the steering angle sensor;

a target steering angle determination unit configured to determine a target steering angle of the vehicle based on the feedforward steering angle and the feedback steering angle;

a wobble determination unit configured to detect a wobble of the vehicle based on a temporal change in the lateral position of the vehicle; and a correction unit configured to correct the feedback steering angle so that a variation amount with respect to an average value of the feedback steering angle in a most recent certain period is reduced when the wobble of the vehicle is detected.

2. The vehicle control device according to claim 1, wherein the wobble determination unit determines that the vehicle wobbles when the number of times a variation amount of the lateral position exceeds a first threshold value within a predetermined period is a second threshold value or more.

3. The vehicle control device according to claim 1, wherein the correction unit stops correction of the feedback steering angle when an amount of change in curvature of a travel lane of the vehicle becomes a third threshold value or more.

4. The vehicle control device according to claim 1, wherein the correction unit stops correction of the feedback steering angle when an amount of change in an inclination angle in a width direction of a travel lane of the vehicle becomes a fourth threshold value or more.

5. The vehicle control device according to claim 1, wherein the correction unit stops correction of the feedback steering angle when an amount of change in the lateral position of the vehicle becomes a fifth threshold value or more.

\* \* \* \* \*